C. S. ELLS.
Clevis.
No. 217,352. Patented July 8, 1879.
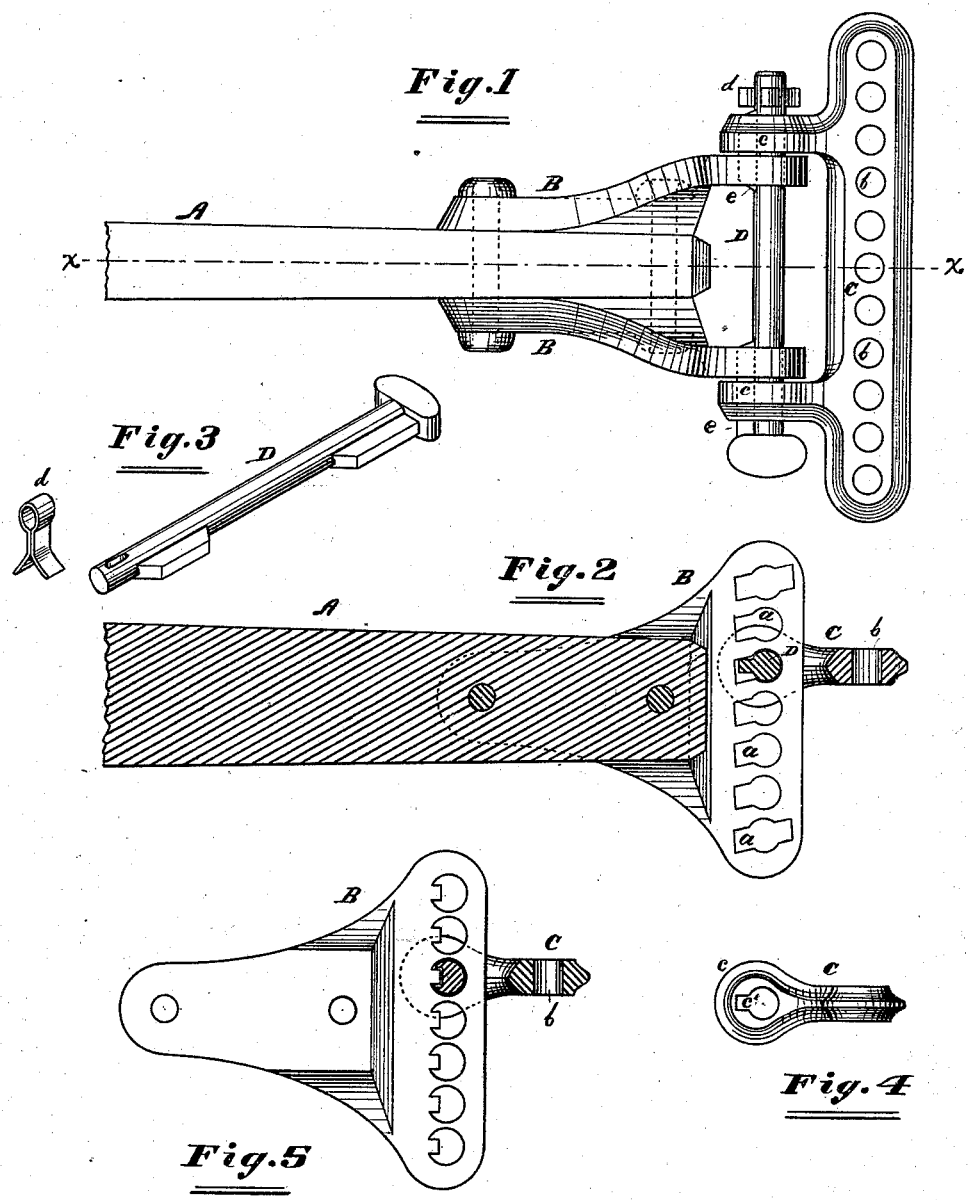
Attest:
Wm. F. Harbach
D. J. Maakeeay
Inventors:
Charles Stewart Ells
By Coyne & Co — his
Attorneys.

UNITED STATES PATENT OFFICE.

CHARLES S. ELLS, OF MOLINE, ILLINOIS.

IMPROVEMENT IN CLEVISES.

Specification forming part of Letters Patent No. 217,352, dated July 8, 1879; application filed February 14, 1878.

*To all whom it may concern:*

Be it known that I, CHARLES STEWART ELLS, of Moline, in the county of Rock Island and State of Illinois, have invented certain new and useful Improvements in Draft-Clevises, of which the following is a specification, reference being also had to the accompanying drawings, forming a part thereof, and in which—

Figure 1 is a top or plan view of a clevis embodying my invention; Fig. 2, a section in the plane of the line $x\ x$; Fig. 3, a perspective of the coupling-pin; Fig. 4, an end view of the cross-link; and Fig. 5, a side elevation of the vertical jaws, showing a modification in form of the coupling-pin and the openings or eyes which receive it.

Like letters of reference indicate like parts.

My invention relates to that class of clevises in which two parts are coupled together in such a manner as to admit of the oscillation, vertically, of one of the parts with relation to the other, and so that the forward part or cross-link will not drop below, or too far below, the coupling-pin; and my invention consists in the means I employ for supporting the cross-link horizontally and admitting of its vertical oscillation, as will be hereinafter more fully described.

For the purpose of illustrating my invention, A in the drawings may represent a plow-beam. B B are plates or jaws arranged vertically, and rigidly applied to the sides of the forward part of the beam beyond which they project, as represented in Figs. 1 and 2.

In the projecting or forward parts of the jaws are the elongated openings $a\ a$, inclining, by preference, rearwardly and downwardly. In the example shown I have made the forward parts of these openings circular to receive a cylindrical coupling-pin, and the circular parts terminate in grooves to receive a tongue or rib on the coupling-pin. This precise form of openings, however, is not absolutely essential, as will hereinafter more fully appear.

C is a cross-link, arranged horizontally, and having therein the eyes $b\ b$. The link C is shouldered, as shown at $c\ c$, to tap the forward ends of the jaws B B. In the shoulders $c\ c$ are made the openings $c'\ c'$, like the openings $a\ a$ in form, but preferably not inclined when the openings $a\ a$ are. The form of the openings $c'\ c'$ may also be varied from that shown without affecting the result I desire to accomplish, as will hereinafter more fully appear.

D is the coupling-pin, which is headed at one end and slotted at the other to receive a pin or fastening, $d$. That part of the pin which rests in the openings $a\ a$ and $c'\ c'$ is tongued or ribbed, as shown at $e\ e$, but in other respects it may be cylindrical; and that part which lies in the rounded or circular parts of the openings should be correspondingly formed, as shown in Fig. 3.

The openings $c'\ c'$ should either be sufficiently small or so formed as to prevent the pin D from being turned therein, while the openings $a\ a$ should be sufficiently large and so formed and arranged as to allow the said pin to be turned considerably therein, thus allowing the link C to oscillate vertically to a considerable extent without allowing it to drop below, or much below, the same horizontal plane in which the pin D is arranged.

It will be perceived that this result will also follow if the pin D be prevented from being turned in the openings $a\ a$, and allowed to turn to the extent described in the openings $c'\ c'$.

It will also be perceived that when the parts now described are arranged together in the manner indicated, the clevis may be adjusted to cause the plow to run deep or shallow, and also to be carried more or less toward the landside; but I make no claim to those features of construction which admit of these results, as my invention relates particularly to the means employed to prevent the cross-link from dropping below a horizontal plane, while allowing it to oscillate or rock vertically within certain limits above that plane.

It will also now be perceived that the essential features of my invention are embodied in the coupling-pin and in the openings through which it passes, and that these parts may be varied from the form and arrangement herein particularly described without exceeding the scope of my invention; and I do not, therefore, herein intend to restrict myself to mere form.

A further modification, for example, of the manner of employing a tongue and groove for the purpose set forth is shown in Fig. 5, wherein a tongue is represented as extending from the jaws into a groove in the coupling-pin, the tongue fitting loosely enough into the groove to admit of the accomplishment of the result desired. A flattened part of the pin, resting loosely in an elongated slot or opening, would admit of a like result.

Having thus described my invention, what I claim as new, and desire to secure by Letters Patent, is—

1. The jaws B B, having therein the openings $a\ a$, the coupling-pin D, having thereon the tongues $e\ e$, and the cross-link C, having therein the openings $c'\ c'$, all combined and arranged substantially as and for the purposes specified.

2. The combination, with each other and a coupling-pin, of the beam-plates and the cross-link or clevis-plate of a plow-clevis, each of the said plates having therein openings shaped, as shown, to receive the said pin, and the said pin having at the parts entering both sets of the said openings enlargements, as described and shown, and the said openings admitting of the forward end of the said link or clevis-plate rising above, but not allowing it to fall below, a horizontal position, substantially as and for the purposes specified.

CHARLES STEWART ELLS.

Witnesses:
HOLMES O. SLEIGHT,
CHARLES W. HEALD.